US011435540B2

(12) United States Patent
Briskey et al.

(10) Patent No.: US 11,435,540 B2
(45) Date of Patent: Sep. 6, 2022

(54) CABLE MANAGEMENT SYSTEM FOR A SPLICE ENCLOSURE, AND A SPLICE ENCLOSURE WITH A CABLE MANAGEMENT SYSTEM

(71) Applicant: PREFORMED LINE PRODUCTS CO., Mayfield Village, OH (US)

(72) Inventors: Ashley Elizabeth Briskey, Cleveland, OH (US); Daniel J. Levac, Gahanna, OH (US); Darnell Johnson, Willoughby Hills, OH (US); John Lee Jones, Independence, OH (US); Micheal Ma, Mayfield Heights, OH (US); Matthew Becker, University Heights, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/016,151

(22) Filed: Sep. 9, 2020

(65) Prior Publication Data
US 2021/0072480 A1 Mar. 11, 2021

Related U.S. Application Data

(60) Provisional application No. 62/897,974, filed on Sep. 9, 2019.

(51) Int. Cl.
*G02B 6/44* (2006.01)
(52) U.S. Cl.
CPC .................. *G02B 6/4442* (2013.01)

(58) Field of Classification Search
CPC .................................................. G02B 6/4442
See application file for complete search history.

(56) References Cited

U.S. PATENT DOCUMENTS

| 5,479,554 | A | 12/1995 | Roberts | |
|---|---|---|---|---|
| 7,783,152 | B2* | 8/2010 | Knorr | G02B 6/4471 385/136 |
| 9,983,377 | B2* | 5/2018 | Dellinger | G02B 6/4471 |

(Continued)

OTHER PUBLICATIONS

Corresponding International Patent Application No. PCT/US2020/049989, International Preliminary Report on Patentability dated Mar. 9, 2022.

(Continued)

*Primary Examiner* — Sung H Pak
(74) *Attorney, Agent, or Firm* — Cooper Legal Group, LLC; William J. Cooper; David A. Resser

(57) ABSTRACT

A cable management system includes a cap that cooperates with a housing to enclose a connection between a first cable and a second cable. The cap defines a first port and a second port through which cables extend into the housing. A base is to be coupled to the cap. The base includes a first clamp that protrudes from a surface of the base and maintains an alignment of a portion of the first cable with the first port. The base also includes a base interlock portion. A first cable guide, separate from the base, is to be installed on the cap to maintain an alignment of a portion of the second cable. The first cable guide includes a second clamp, and a first cable guide interlock portion that cooperates with the base interlock portion to interfere with separation of the first cable guide from the base.

20 Claims, 9 Drawing Sheets

(56) References Cited

U.S. PATENT DOCUMENTS

| | | |
|---|---|---|
| 2005/0175307 A1 | 8/2005 | Battey et al. |
| 2011/0194829 A1 | 8/2011 | Cubala et al. |
| 2018/0239099 A1* | 8/2018 | Flores .................. G02B 6/3887 |
| 2019/0204523 A1 | 7/2019 | Bishop et al. |

OTHER PUBLICATIONS

Corresponding International Patent Application No. PCT/US2020/049989, International Search Report and Written Opinion, dated Dec. 23, 2020.

* cited by examiner

CABLE MANAGEMENT SYSTEM FOR A SPLICE ENCLOSURE, AND A SPLICE ENCLOSURE WITH A CABLE MANAGEMENT SYSTEM

CROSS REFERENCE TO RELATED APPLICATIONS

This application claims priority to U.S. Provisional Patent Application No. 62/897,974, filed on Sep. 9, 2019, entitled "CABLE MANAGEMENT SYSTEM FOR A SPLICE ENCLOSURE, AND A SPLICE ENCLOSURE WITH A CABLE MANAGEMENT SYSTEM," which is hereby incorporated by reference herein.

TECHNICAL FIELD

The instant application is generally directed toward a cable management system for a splice enclosure, and a splice enclosure including such a cable management system. For example, the cable management system can support a plurality of fiber optic cables at the splice enclosure. At least two of the fiber optic cables are coupled together, to facilitate fiber optic communications over the coupled fiber optic cables.

BACKGROUND

Cables, such as fiber optic cables for example, are deployed to form a network of communication channels over which computers, telephones, electronic devices, etc. can communicate. To satisfy an ever-growing demand for such communication channels, fiber optic cables often include many individual fibers. An individual fiber from a first fiber optic cable can be selectively connected to another fiber included in a second fiber optic cable at a splice enclosure, which is commonly referred to as a "dome."

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to some embodiments, a cable management system includes a cap that cooperates with a housing to enclose a connection between a first cable and a second cable. The cap defines a first port through which the first cable is extendable into the housing, and a second port through which the second cable is extendable into the housing. A base is to be coupled to the cap. The base includes a first clamp that protrudes from a surface of the base and maintains an alignment of a portion of the first cable with an axis relative to a plane within which the first port is defined. The base also includes a base interlock portion. A first cable guide, separate from the base, is to be installed on the cap to maintain an alignment of a portion of the second cable with the second port. The first cable guide includes a second clamp, and a first cable guide interlock portion that cooperates with the base interlock portion to interfere with separation of the first cable guide from the base.

According to some embodiments, the cap includes a guide surface that defines a region where the first cable guide is to be installed on the cap, and interferes with angular adjustment of the first cable guide about the first clamp protruding from the surface of the base while the first cable guide is installed on the cap.

According to some embodiments, the cap defines a third port through which a third cable is extendable into the housing. The base includes a third clamp that protrudes from the surface of the base to maintain an alignment of a portion of the third cable with the third port.

According to some embodiments, a fastener cooperates with the first cable guide and the cap to interfere with separation of the first cable guide from the cap and the base.

According to some embodiments, the cap includes a valve that controls a pressure within the housing, and the base defines an aperture that receives the valve, to render the valve accessible through the aperture defined by the base while the base is installed on the cap.

According to some embodiments, the cap defines a third port through which a third cable is extendable into the housing. The cable management system includes a second cable guide, separate from the base, that is to be installed on the cap. The second cable guide includes: a third clamp that cooperates with a portion of the third cable, to maintain an alignment of a portion of the third cable with the third port, and a second cable guide interlock portion that cooperates with the base interlock portion to interfere with separation of the second cable guide from the base.

According to some embodiments, the first cable guide and the second cable guide have a common shape.

According to some embodiments, a first angle is defined between the first port and the second port relative to a central point of the cap, and a second angle is defined between the second port and the third port relative to the central point of the cap. The first angle is equal to the second angle.

According to some embodiments, a splice enclosure includes a housing defining an interior space. A connector module supports a connection between a first cable and a second cable within the interior space defined by the housing. The splice enclosure also includes a cable management system. Some embodiments of the cable management system include a cap that cooperates with the housing to enclose the connection between a first cable and a second cable. The cap defines a first port through which the first cable is to extend into the housing, and a second port through which the second cable is to extend into the housing. A base to be coupled to the cap includes a first clamp that protrudes from a surface of the base. The first clamp maintains an alignment of a portion of the first cable with an axis relative to a plane within which the first port is defined. The base also includes a base interlock portion. A first cable guide, separate from the base, to be installed on the cap maintains an alignment of a portion of the second cable with a region of the cap defining the second port. The first cable guide includes a second clamp, and a first cable guide interlock portion that cooperates with the base interlock portion to interfere with separation of the first cable guide from the base.

According to some embodiments, the cap includes a guide surface that defines a region where the first cable guide is to be installed on the cap, and interferes with angular adjustment of the first cable guide about the first clamp protruding from the surface of the base while the first cable guide is installed on the cap.

According to some embodiments, the cap defines a third port through which a third cable is extendable into the housing. The base includes a third clamp that protrudes from the surface of the base to maintain an alignment of a portion of the third cable with the third port.

According to some embodiments, a fastener cooperates with the first cable guide and the cap to interfere with separation of the first cable guide from the cap and the base.

According to some embodiments, the cap includes a valve that controls a pressure within the housing, and the base defines an aperture that receives the valve, to render the valve accessible through the aperture defined by the base while the base is installed on the cap.

According to some embodiments, the cap defines a third port through which a third cable is extendable into the housing. The cable management system includes a second cable guide, separate from the base, that is to be installed on the cap. The second cable guide includes: a third clamp that cooperates with a portion of the third cable, to maintain an alignment of a portion of the third cable with the third port, and a second cable guide interlock portion that cooperates with the base interlock portion to interfere with separation of the second cable guide from the base.

According to some embodiments, the first cable guide and the second cable guide have a common shape.

According to some embodiments, a first angle is defined between the first port and the second port relative to a central point of the cap, and a second angle is defined between the second port and the third port relative to the central point of the cap. The first angle is equal to the second angle.

According to some embodiments, a method includes extending a portion of a first cable through a first port defined by a cap. The cap is to be installed on a housing to enclose an interior space where a connection between the first cable and a second cable is to be located. A portion of a second cable is extended through a second port defined by the cap. A protruding region of the first cable, exposed at an external side of the cap to be external of the housing with the cap installed, is secured within a first clamp that protrudes from a surface of a base coupled to the cap to maintain a position of the protruding region of the first cable relative to a region of the cap defining the first port. A first cable guide is arranged relative to the base on the cap to position a second clamp provided to the first cable guide adjacent to the second port. A protruding region of the second cable, exposed at the external side of the cap to be external of the housing with the cap installed, is secured within the second clamp to maintain a position of the protruding region of the second cable relative to a region of the cap defining the second port.

According to some embodiments, arranging the first cable guide relative to the base includes engaging a base interlock portion provided to the base with a first cable guide interlock portion to interfere with separation of the first cable guide from the base.

According to some embodiments, the method includes extending a portion of a third cable through a third port defined by the cap. A second cable guide is arranged relative to the base on the cap to position a third clamp provided to the second cable guide adjacent to the third port. A protruding region of the third cable, exposed at the external side of the cap to be external of the housing with the cap installed, is secured within the third clamp to maintain a position of the protruding region of the third cable relative to a region of the cap defining the third port.

According to some embodiments, arranging the second cable guide relative to the base includes engaging a base interlock portion provided to the base with a second cable guide interlock portion provided to the second cable guide to interfere with separation of the second cable guide from the base.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
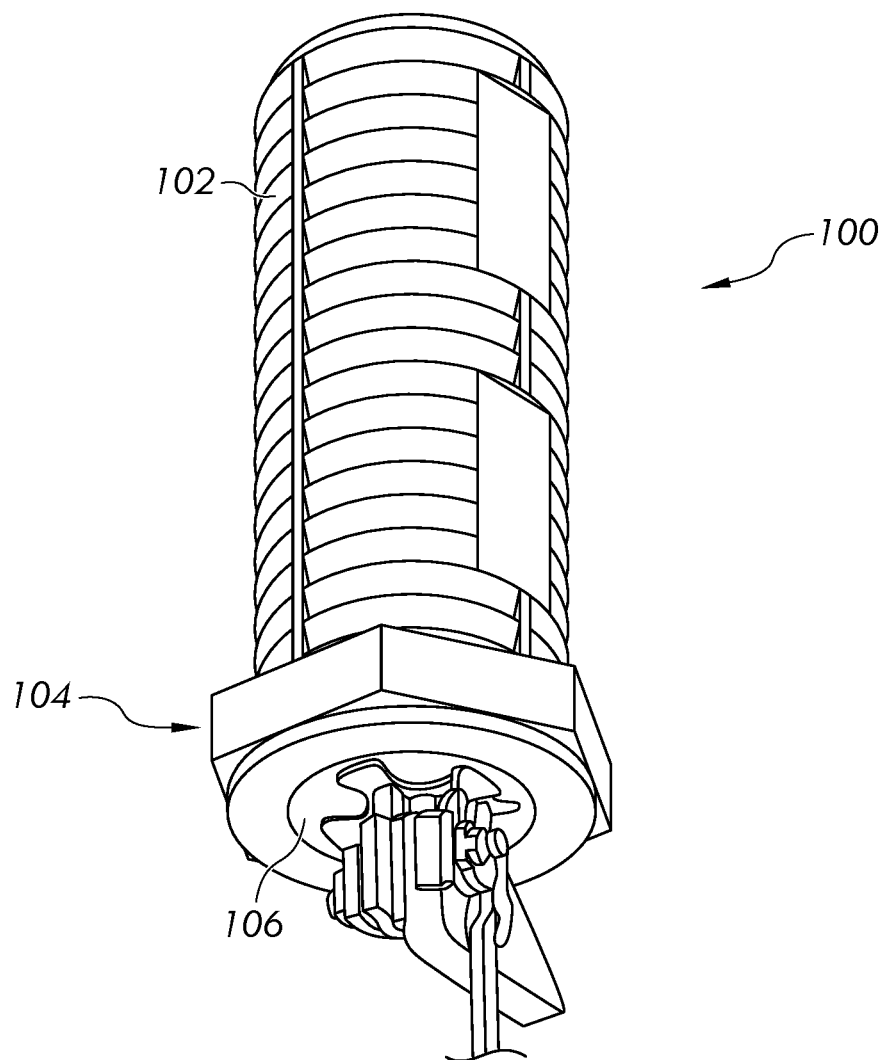
FIG. 1 is a perspective view of an embodiment of a splice enclosure including a cable management system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

A splice enclosure includes a housing defining an interior space in which a connection between a first cable and a second cable is to be supported. A cap encloses the interior space and includes a first port through which the first cable enters the interior space and a second port through which the second cable enters the interior space. Because the orientation and location of splice enclosures vary by application, the first and second cables can be subjected to forces that may affect the connection between the first and second cables.

A cable management system and a splice enclosure are disclosed herein to at least partially mitigate the forces impacting the connection. To provide flexibility in the number of cables, or in the selection of a port through which one or more of the cables is to extend into the interior space of the housing, some embodiments of the cable management system are modular. According to such embodiments, a base that includes a first clamp and a base interlock portion is coupled to the cap.

The first clamp protrudes from a surface of the base, in a direction to extend generally away from the housing while the cap is installed on the housing. Thus, the first clamp cooperates with the first cable externally of the housing to which the cap is provided. The first clamp is to be coupled to a portion of the first cable that is extending through the first port defined by the cap, into the interior space of the housing.

A cable guide, which is separate from the base, is to be selectively installed at an expansion location on the cap, as desired. For some embodiments, the expansion location is included among a plurality of available expansion locations of the cap. For some embodiments, the cap can include at least one (1) expansion location, or at least two (2) expansion locations, or at least three (3) expansion locations, or at least four (4) expansion locations, or at least five (5) expansion locations, or at least six (6) expansion locations, etc.

The expansion locations include additional, expansion ports defined by the cap leading to the interior space defined by the housing, and the cable guide installed at an expansion port maintains an alignment of a cable extending through the respective expansion port. Thus, the cable management system is expandable to support a number of cables entering the interior space of the housing to accommodate different installations.

According to some embodiments, the base interlock portion can include at least one of a male member, a female receiver, or a combination thereof. For some embodiments, the base interlock portion includes a tab, a blank, or a combination thereof. To install the modular cable guide at an expansion location, the tab, blank, or combination thereof provided to the base interlock portion cooperates with a mating tab, blank, or combination thereof provided to a cable guide interlock portion of the cable guide. Some embodiments of the cable management system include a fastener that engages the cable guide at the expansion location and the cap to interfere with separation of the cable guide from the cap and base.

Referring now to the drawings, FIG. 1 is a perspective view of an embodiment of a splice enclosure 100. The illustrated embodiment of the splice enclosure includes a housing 102 that defines an interior space in which a connection between at least a first cable 202 (FIG. 2) and a second cable 204 (FIG. 2) is to be enclosed. The housing 102 is formed from any suitably durable material that can withstand the environmental conditions where the splice enclosure 100 is to be installed. An example of a material for the housing 102 includes, but is not limited to, plastics such as ultraviolet-resistant, thermosetting polymers, and the like.

A cable management system 104 encloses an opening formed in the housing 102, leading into the interior space. Embodiments of the cable management system 104 include a cap 106 that cooperates with the opening formed in the housing 102 leading into the interior space. Some embodiments of the cap 106 include a compressible gasket 206 (FIG. 2), facilitating the formation of an air-tight enclosure as a result of cooperation between the housing 102 and the cap 106.

Figure 9:
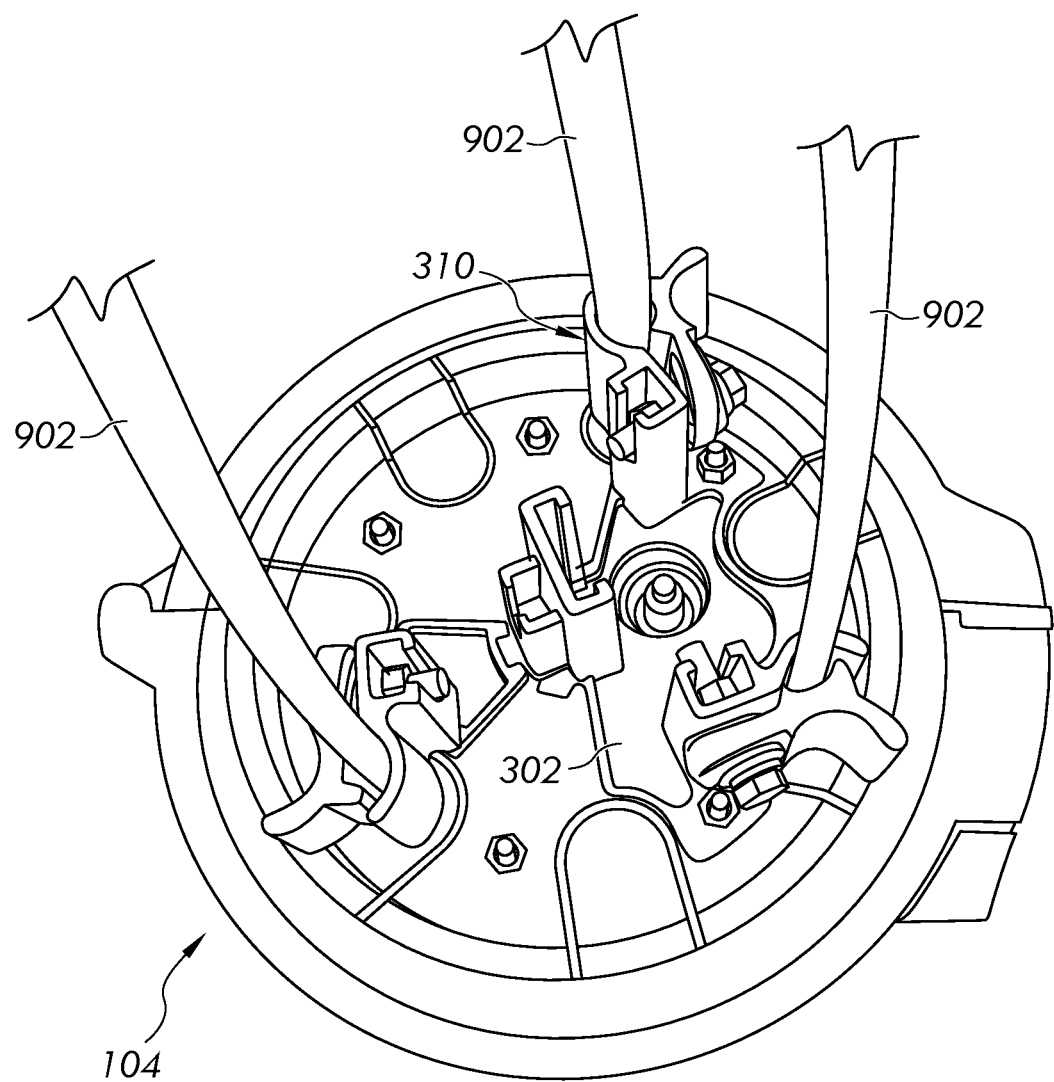
FIG. 9 is a top view of a cable management system in a condition of use for maintaining an alignment of optical ground wire relative to ports in a cap.

The first cable 202 and the second cable 204 are shown as fiber optic cables within a flexible, dielectric jacket. However, according to some embodiments, the cable management system 104 is configured to maintain an alignment of optical ground wire "OPGW" cables 902 introduced to the housing 102 relative to ports, as shown in FIG. 9. The OPGW cables 902 include one or more optical fibers within a tubular jacket, which is surrounded by one or more layers of conductive wire helically wound about the tubular jacket. The OPGW cables 902 extend between towers supporting electrical power lines, and connect the towers to earth ground. For the sake of brevity and clarity, however, fiber optic embodiment of the first cable 202 and the second cable 204 are used to describe the cable management system 104.

Figure 2:
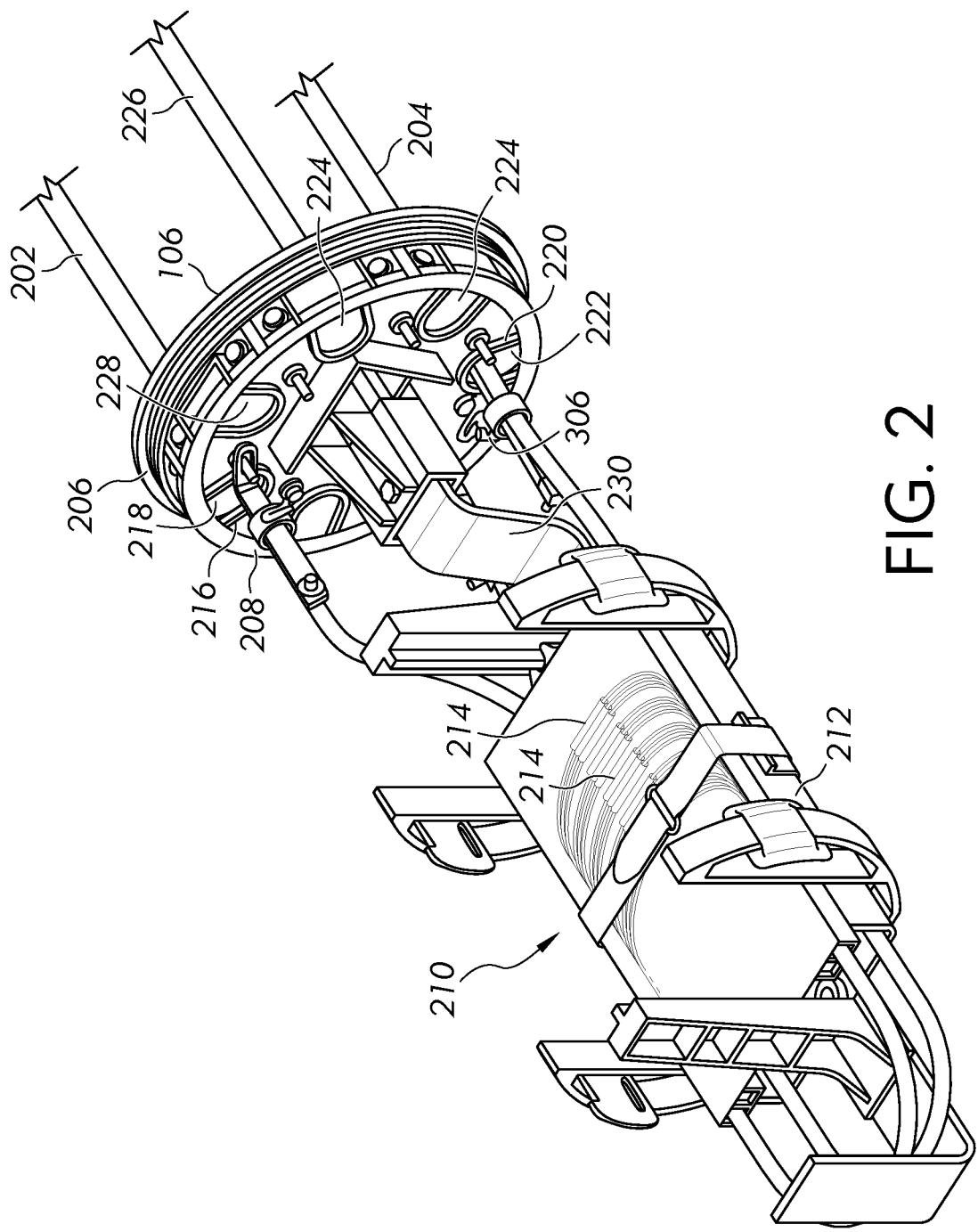
FIG. 2 is a cutaway view showing an organizer that supports a connection between an optical fiber of a first cable and an optical fiber of a second cable, the organizer being coupled to a cable management system that is to be installed on a housing of a splice enclosure.

FIG. 2 is a perspective view of an internal side 208 of the cap 106, coupled to an organizer 210 that supports a connection between the first cable 202 and the second cable 204. While the splice enclosure 100 is assembled, the internal side 208 of the cap 106 faces inwardly, into the interior space defined by the housing 102, where the organizer 210 is supported.

Some embodiments of the organizer 210 include a tray 212 with a plurality of splice grooves 214. The splice grooves 214 include apertures that receive an individual fiber included in the first cable 202 and an individual fiber included in the second cable 204. A connection is established between the individual fibers from the first and second cables 202, 204 received within the respective aperture, allowing fiber optic light signals to be conveyed between the connected fibers.

Some embodiments of the cap 106 include a plurality of ports through which at least a portion of the first cable 202 and the second cable 204 extend into the interior space of the housing 102. For the illustrated embodiment of FIG. 2, a first port 216 is defined by the cap 106, forming an aperture through which the first cable 202, or a portion thereof, extends into the interior space of the housing 102. An elastically-compressible grommet 218 forms a seal around the first cable 202 within the first port 216. A second port 220 is defined by the cap 106, forming an aperture through which the second cable 204, or a portion thereof, extends into the interior space of the housing 102. A compressible grommet 222 forms a seal around the second cable 204 within the second port 220.

Some embodiments of the cap 106 also include one or more (e.g., up to eight, or up to six, or up to five, or up to four, etc.) expansion ports 224, corresponding to expansion locations through which at least a third cable 226 extends into the interior space defined by the housing 102. For example, one or more individual fibers included in the third cable 226 is/are configured to be received within a splice groove 214 to establish a connection with one or more fibers of the first cable 202 or the second cable 204. For some embodiments, such as the embodiment illustrated in FIG. 3, there are seven (7) total ports 216, 220, 224.

When not in use, the expansion ports 224 are closed by stoppers 228 according to some embodiments. The stopper 228 for the individual expansion port is cut away, or otherwise removed from the cap 106, as needed, at a time when the third cable 226, for example, is to be introduced to the interior space defined by the housing 102.

Figure 3:
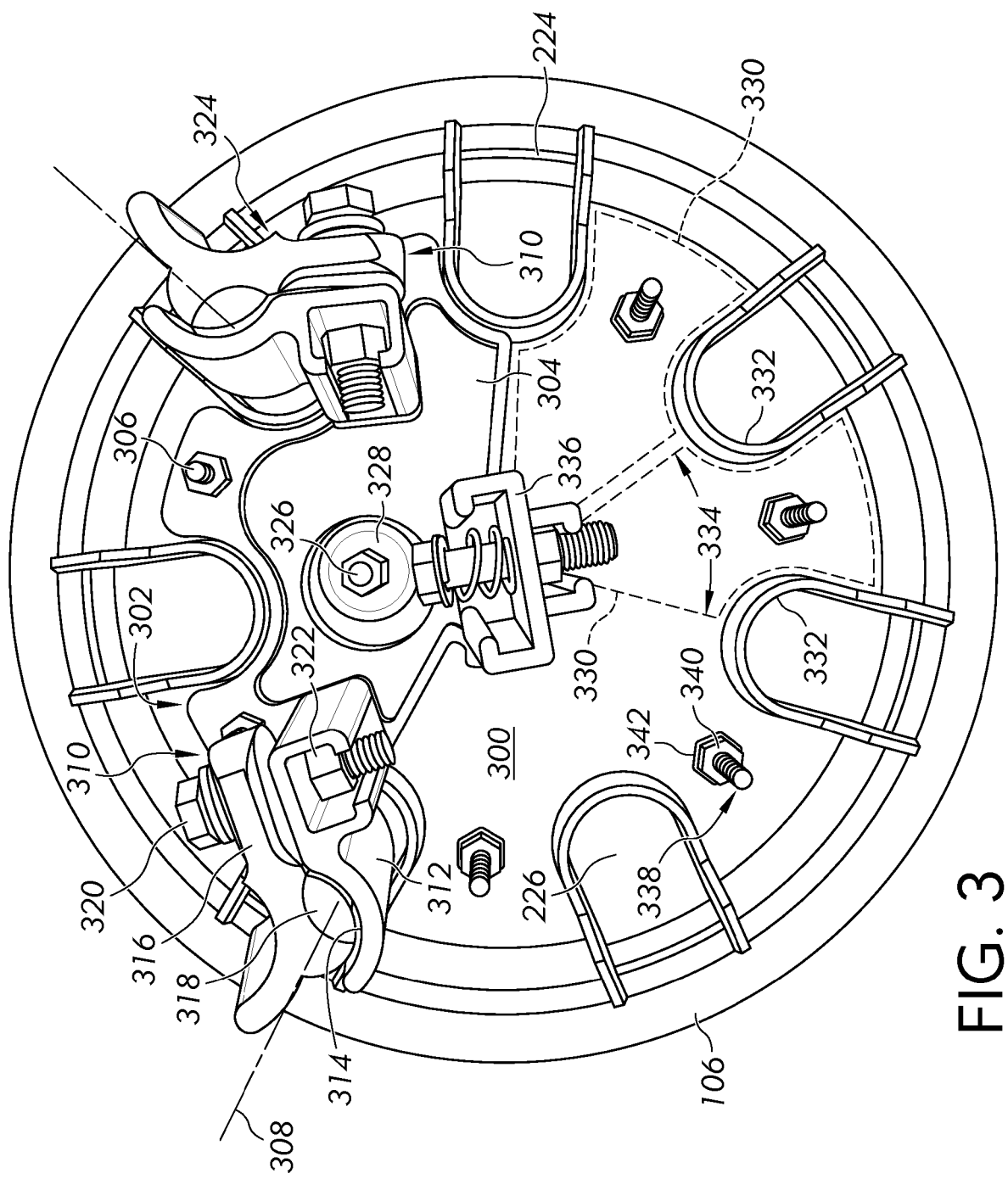
FIG. 3 is a top view of a cap for a cable management system including a base and a plurality of expansion locations including respective expansion ports.

FIG. 3 is a top view of an outward-facing surface 300 of the cap 106. According to some embodiments, a base 302 is to be coupled to the outward-facing surface 300 of the cap 106. Embodiments of the base 302 include a plate 304 fabricated from a metal, metal alloy, or other suitably-rigid material to support the weight of the splice enclosure 100 according to some embodiments, however, the base 302 can be formed from other materials without departing from the scope of the present disclosure.

At least one, or a plurality of fasteners 306 engage(s) the plate 304 and the outward-facing surface 300 of the cap 106, to couple the plate 304 to the cap 106. As shown in FIG. 2, one or a plurality of the fasteners 306 can engage the organizer 210, or a support structure 230 extending between the organizer 210 and the cap 106, to couple the organizer 210 to the cap 106. According to some embodiments, coupling the organizer 210 to the cap may block one, or a plurality of the expansion ports 224. For such embodiments, the number of usable ports is given as:

$$UP = TP - BP$$

Where UP is the number of usable ports, through which a portion of a cable can be extended into the interior space defined by the housing 102; TP is the total number of ports 216, 220, 224 physically present on the cap 106, whether blocked by stoppers 228 or opened; and BP is the number of blocked ports through which access to the interior space defined by the housing 102 is blocked by the organizer 210 or support structure 230.

Referring once again to FIG. 3, at least a first clamp 310 protrudes upward from a surface of the plate 304 provided to the base 302. The first clamp 310 extends generally away from the interior space defined by the housing 102, to be supported externally of the housing 102. The first clamp 310 maintains an alignment of a portion of the first cable 202 with an axis 308. Some embodiments of the axis 308 are relative to a plane within which the first port 216 is defined by the cap 106. In some embodiments, the axis 308 is perpendicular to the plane within which the first port 216 is defined by the cap 106. In other embodiments, the axis 308 is oblique or non-perpendicular to the plane within which the first port 216 is defined by the cap 106. For some embodiments, the axis 308 is a longitudinal axis of the first cable 202, which can be orthogonal to a major surface of the cap 106. According to some embodiments, the axis 308 along which the first cable 202 is maintained is substantially parallel to a longitudinal axis of the housing 102 (e.g., forms an acute angle relative to the longitudinal axis of the housing 102, or forms an angle that is within ±10 degrees of the longitudinal axis of the housing 102).

The first clamp 310 is any locking structure that is to be coupled to the first cable 202, thereby maintaining the alignment of the portion of the first cable 202 retained by the first clamp 310 with the axis 308. For some embodiments, the first clamp 310 includes a bolster 312. Embodiments of the bolster 312 are integrally formed as a monolithic structure as part of the plate 304. The bolster 312 includes an arcuate region 314, which has a radius of curvature that is comparable to a curvature of the first cable 202, to receive the first cable 202.

A keeper 316 is adjustably coupled to the bolster 312, or another portion of the first clamp 310. Some embodiments of the keeper 316 include an arcuate region 318 having a radius of curvature that is suitable to extend about at least a portion of the first cable 202, when the first cable 202 is secured in the first clamp 310. At least a portion of the keeper 316 is adjustable relative to the bolster 312 to change a distance separating the adjustable portion of the keeper 316 from an opposing portion of the bolster 312, between which the first cable 202 is to be secured. Some embodiments include a threaded fastener 320 such as a bolt, for example, that extends between a portion of the bolster 312 and a portion of the keeper 316. A mating fastening portion 322 such as an internally-threaded nut, for example, is arranged to cooperate with the threaded fastener 320 and urge the keeper 316 toward the bolster 312, clamping the first cable 202 there between.

The embodiment of the base 302 shown in FIG. 3 includes at least the first clamp 310. However, some embodiments of the base 302 include a plurality of clamps, including the additional clamp 324 for example, which is similar in construction to the first clamp 310.

According to some embodiments, the base 302 includes a mounting bracket 336. The mounting bracket 336 engages a frame member 600 (FIG. 6) that couples the splice enclosure 100 to a fixture such as a utility pole or tower, a building, or other structure, for example, where the splice enclosure 100 is to be installed. The mounting bracket 336 can be formed as a portion of the base 302 that is to be located at a central region of the cap 106 when the base 302 is installed on the cap 106.

Some embodiments of the cap 106 include a valve 326. The valve is operable to allow a compressed gas such as air, or an inert gas, for example, to be inserted into the interior space defined by the housing 102. As mentioned above, embodiments of the splice enclosure 100 are airtight. The compressed gas is introduced into the interior space defined by the housing 102 through the valve 326 to test the integrity of the seal between the cap 106 and the housing 102. Some embodiments of the plate 304 forming a portion of the base 302 include an aperture 328. The valve 326 is accessible through the aperture 328 formed in the plate 304, while the base 302 is installed on the cap 106. In other words, the gas is to be introduced into the housing 102, and exhausted from the interior space defined by the housing 102 through the valve 326 without requiring the base 302 to be removed from, or adjusted on the cap 106.

Figure 4:
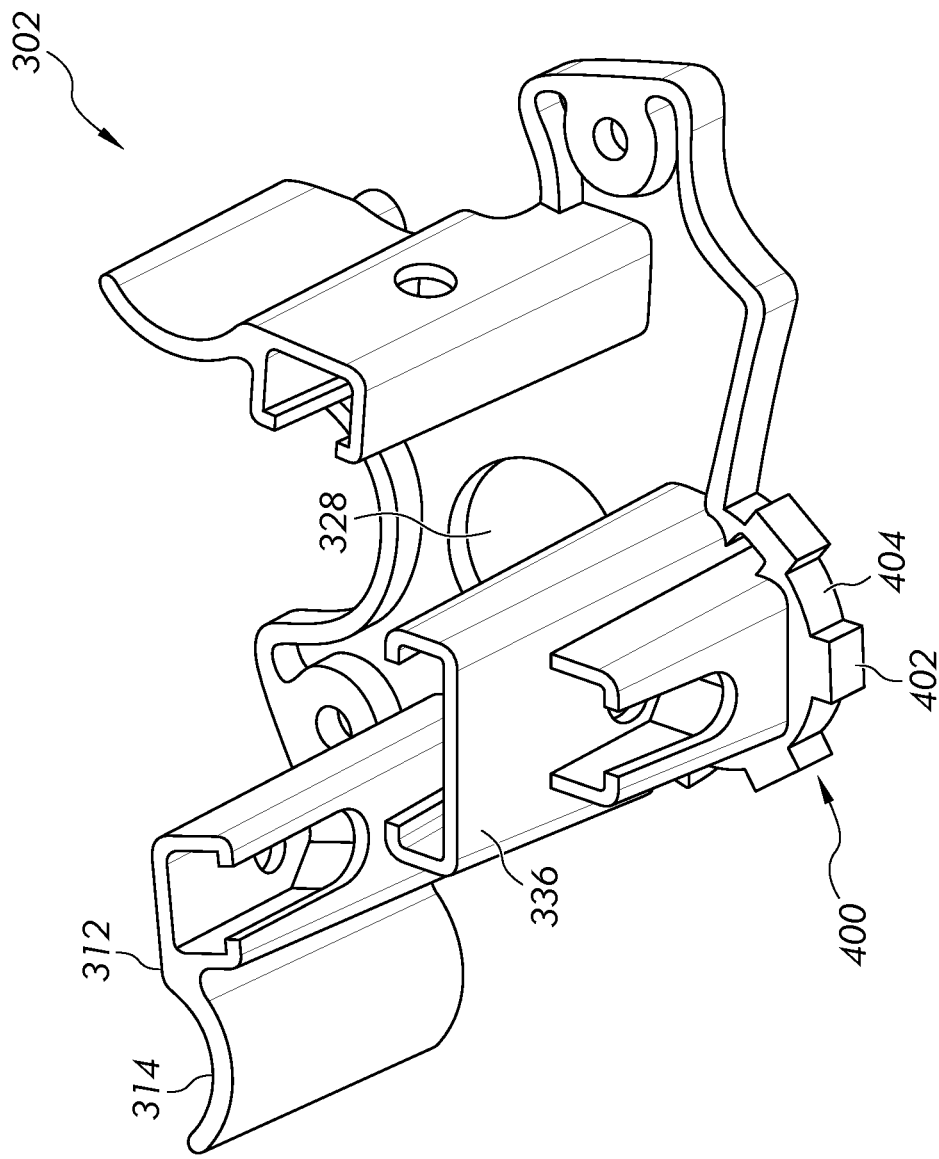
FIG. 4 is a perspective view of an embodiment of a base of a cable management system, the base including at least one clamp and a base interlock portion.

FIG. 4 is a perspective view of an embodiment of the base 302 that includes a base interlock portion 400. The base interlock portion 400 cooperates with a cable guide interlock portion 500 (FIG. 5) provided to a modular cable guide 502 to interfere with separation of the cable guide 502 from the base 302 as explained below. According to some embodiments, the base interlock portion 400 includes at least one male member 402, or a plurality of male members that protrude from a peripheral surface 404. Other embodiments of the base interlock portion 400 include a male member, a female receiver, or a combination of a male member 402 and a female receiver. At least one male member 402 or other structure of base interlock portion 400 can be arranged to cooperate with a cable guide 502 installed in each of a plurality of expansion locations 330 (outlined with broken lines in FIG. 3) on the cap 106.

Although two expansion locations 330 are outlined in FIG. 3, any number of expansion locations 330 can be included on the cap 106. Further, the expansion locations 330 can be symmetrically-shaped on the cap 106 according to some embodiments. An angle between the expansion ports 224 about a central point (e.g., corresponding to a location of the mounting bracket 336) of the cap 106 can be the same. In other words, the angle between a first pair of contiguous expansion ports 224 is equal to the angle between a second, different pair of contiguous expansion ports 224. As a result, a plurality of the same cable guides 502 (e.g., common physical construction), can be installed on the cap 106 in a symmetrical collection as part of the cable management system 104.

Being symmetrically-shaped, a number N of expansion locations 330 can exist about a central region of the cap 106, where the number N is an integer. For the embodiment in FIG. 3, the expansion locations 330 have a modified conical footprint, allowing expansion locations 330 of the same shape to be arranged angularly about the central region of the cap 106.

Because the expansion locations 330 can have footprints of the same shape, a plurality of cable guides 502 having the same physical shape, or at least the same footprint, can be installed in the expansion locations 330. Thus, the number of location-specific components can be limited, allowing a common cable guide 502 (i.e., having the same shape or structural configuration) to be installed at any of a plurality of expansion locations 330 on the cap 106, as described in detail below.

Figure 5:
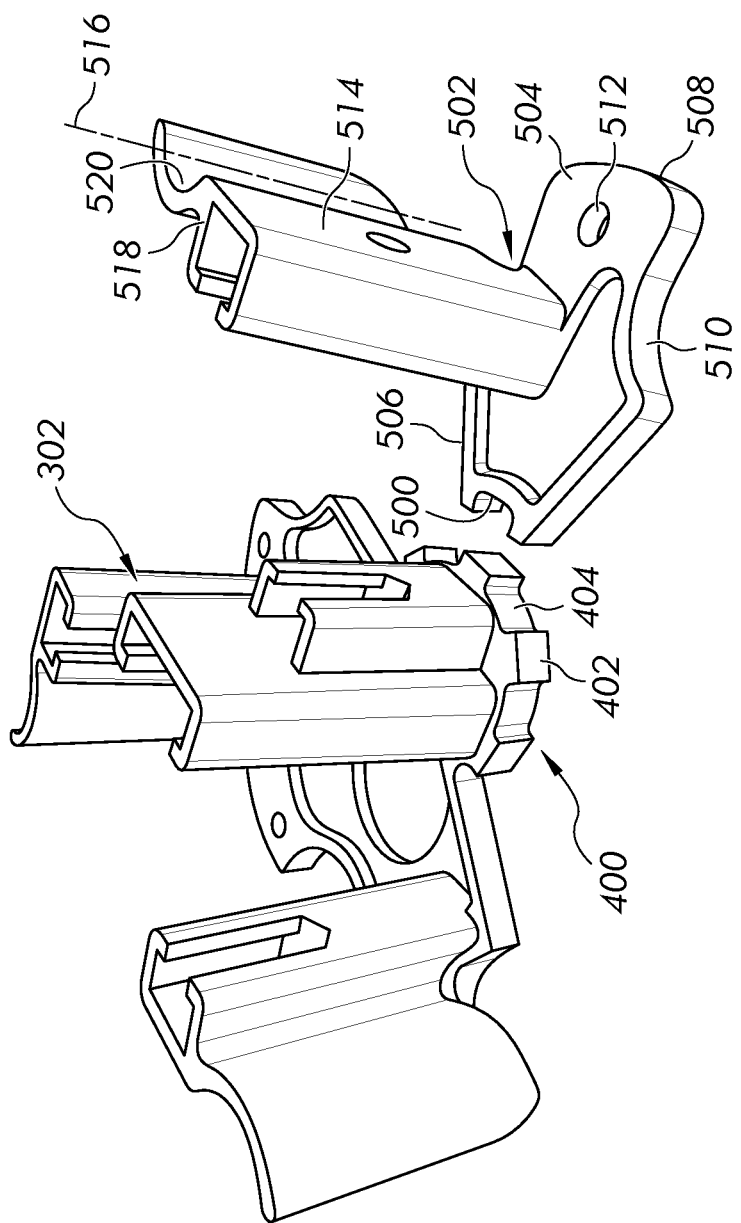
FIG. 5 is an exploded view of an embodiment of a base of a cable management system and an embodiment of a cable guide of the cable management system, arranged to facilitate communication between a base interlock portion and a cable guide interlock portion.

The cable guide 502 shown in FIG. 5 includes a platform 504 with a footprint that is compatible to rest within an expansion location 330 (shown in broken lines in FIG. 3) on the outward-facing surface 300 of the cap 106. The footprint of the platform 504 can have the shape of the outline of the expansion location 330, but relatively smaller, to fit within the outline of the expansion location 330. Some embodiments of the outward-facing surface 300 of the cap 106 include at least one, or a plurality of guide surfaces 332 that defines a boundary of the expansion location(s) 330. For example, a wall protruding upward from the outward-facing surface 300 in FIG. 3 extends at least partially about a periphery of the ports 216, 220, 224 to establish the guide surfaces 332. The footprint of the platform 504 fits between the guide surfaces 332 on opposite sides of the platform. Thus, the guide surfaces 332 collectively interfere with angular adjustment of the platform 504, about a central region of the cap 106 (in directions indicated by arrows 334) within the plane of the platform 504, while the platform 504 is resting on the outward-facing surface 300.

A clamp 514 protrudes upwardly, generally away from the platform 504. Some embodiments of the clamp 514 are configured similar to, or the same as the first clamp 310, described in detail above. Generally, the clamp 514 can be any locking structure that is to be coupled to a cable, such as the third cable 226 for example, thereby maintaining the alignment of a portion of the third cable 226 retained by the clamp 514 with an axis 516. For some embodiments, the clamp 514 of the cable guide 502 includes a bolster 518. Embodiments of the bolster 312 are integrally formed as a monolithic structure as part of the platform 504. The bolster 518 includes an arcuate portion 520, which has a radius of curvature that is comparable to a curvature of the third cable 226, to receive the third cable 226. The axis 516 can be a longitudinal axis of the arcuate portion 520 of the bolster 518, which can be coaxially aligned, or parallelly-aligned with the expansion port 224 through which the third cable 226 extends.

A keeper, which can be the same as keeper 316 described above, is adjustably coupled to the bolster 518, or another portion of the clamp 514. For the sake of brevity, the detailed description of the keeper is not reproduced at this point. Generally, the keeper can be coupled to the clamp 514 by a threaded fastener that is adjustable to urge the keeper toward the bolster 518, securing the third cable 226 to the clamp 514.

According to some embodiments, the platform 504 includes a nose region 506 that is proximate to the base 302 while the base 302 and the cable guide 502 are installed on the cap 106. A distal region 508 of the platform 504 is shaped to fit between the guide surfaces 332 of adjacent expansion locations 330. For example, arcuate regions 510 similar in shape to the curvature of the guide surfaces 332 are formed adjacent to the distal region 508.

The nose region 506 includes the cable guide interlock portion 500, which is shown as including a female receiver in the embodiment in FIG. 5. To be installed on the cap 106, the cable guide 502 is positioned at an available expansion location 330. The cable guide interlock portion 500 of the nose region 506 is positioned proximate to the base interlock portion 400, causing engagement of the interlock portions. For the embodiment shown in FIG. 5, the female receiver of the cable guide interlock portion 500 receives the male member 402 of the base interlock portion 400. While the cable guide interlock portion 500 is engaged with the base interlock portion 400, a position of the nose region 506 within the plane of the platform 504 on the outward-facing surface 300 of the cap 106 is maintained. In other words, cooperation between the cable guide interlock portion 500 and the base interlock portion 400 interferes with rotation of the nose region 506 relative to the base 302 within the plane of the platform 504.

Figure 6:
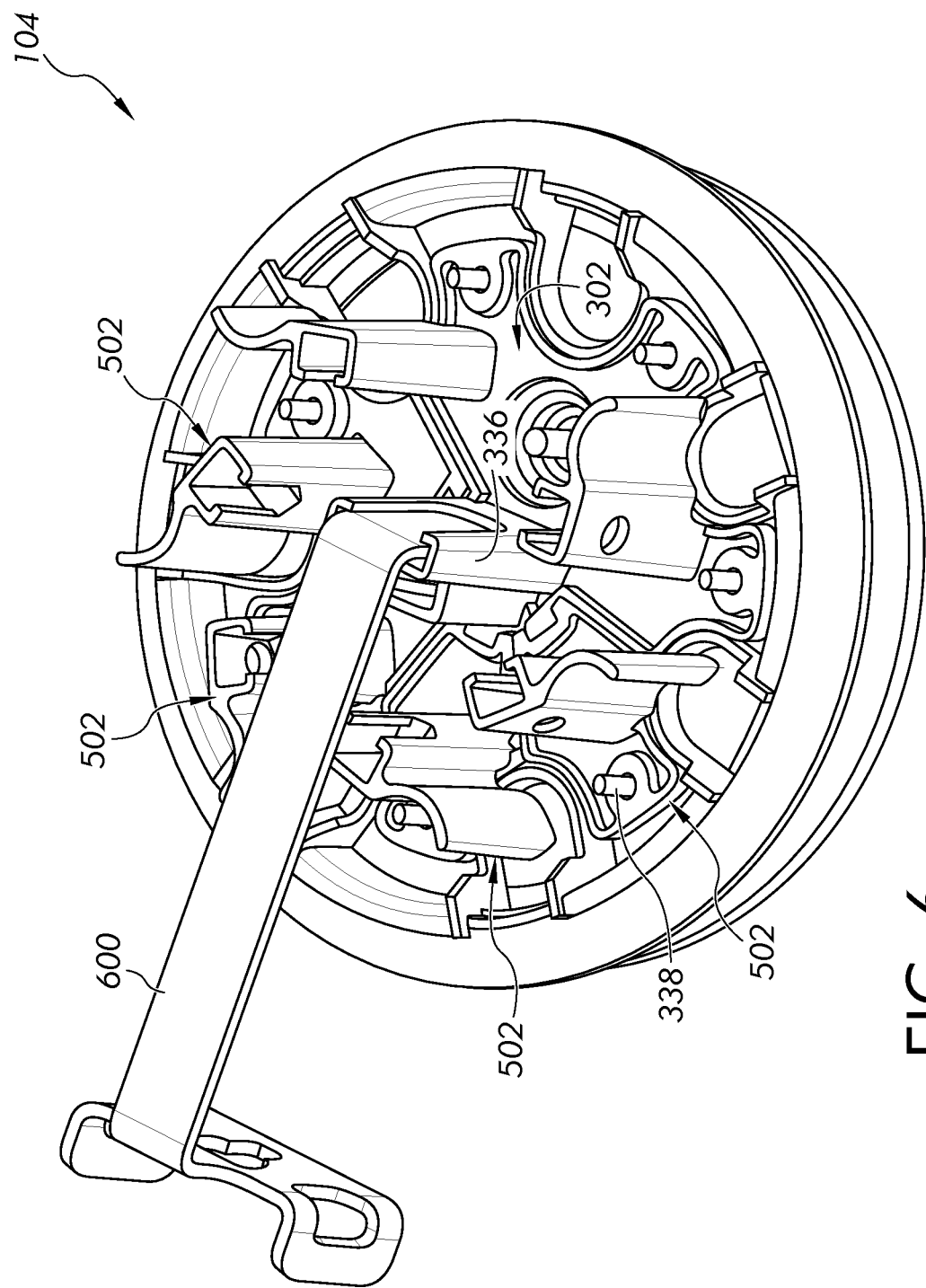
FIG. 6 is a perspective view of an embodiment of a cable management system with a mounting bracket and a capacity of cable guides installed.

Some embodiments of the platform 504 include an aperture 512 that receives a fastener 338 (FIGS. 3 and 6). Examples of the fastener 338 include, but are not limited to a bolt, screw, rivet, or any other device that engages the platform 504 and a portion of the cap 106 to urge the platform 504 toward the externally-exposed surface 300 of the cap 106. As one example, the fastener 338 in FIG. 3 includes a bolt having a hexagonal head 340 that is received within a socket 342 formed as part of the cap 106. Such a fastener 338 can be provided to one, a plurality of, or each expansion location 330 to facilitate the installation of a cable guide 502 at the expansion location(s) 330, as desired. When installation of a cable guide 502 is desired, the platform 504 of the cable guide 502 is placed at the expansion location 330 by placing the aperture 512 over the fastener 338. A nut 700 (FIG. 7) or other locking member compatible with the fastener 338 is installed over the platform 504, thereby coupling the cable guide 502 to the cap 106.

According to some embodiments, the fastener 338 can be separable from the cap 106. For example, the fastener 338 can include a bolt that is inserted through the aperture 512 formed in the platform 504 of the cable guide 502 at an expansion location 330 on the cap 106. The nut 700, or another suitable locking member, can be threaded onto an end of the bolt protruding from the internal side 208 of the cap 106. The compressive force exerted on the platform 504 and cap 106 by the combined fastener 338 and nut 700 assembly urges the platform 504 toward the cap 106, securing the cable guide 502 to the cable management system 104.

Figure 7:
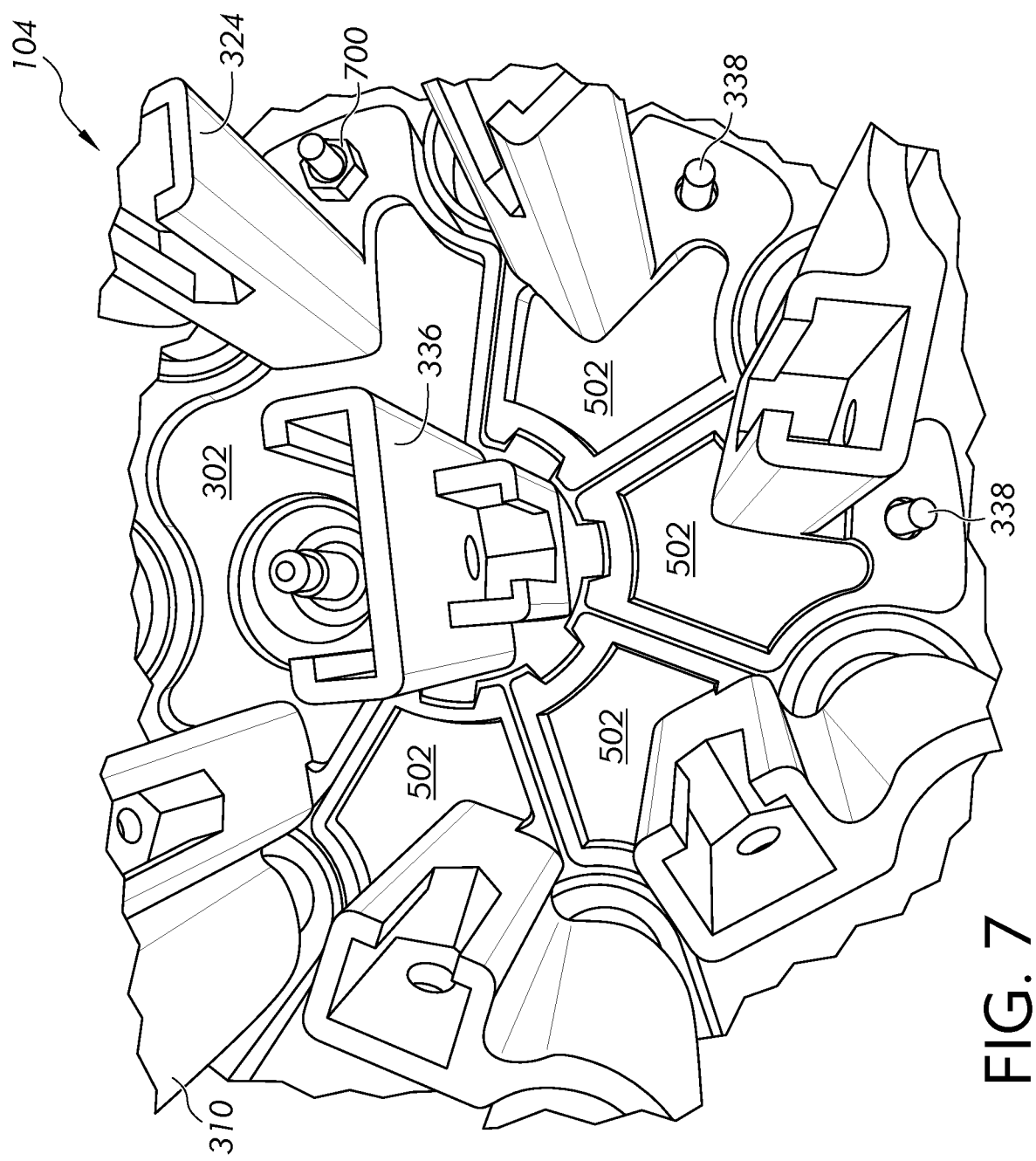
FIG. 7 is a top view of an embodiment of a cable management system with a capacity of cable guides installed.

The illustrative embodiments shown in FIGS. 3, 6, and 7, the base 302 includes two clamps: the first clamp 310 and the additional clamp 324. The first clamp 310 and the additional clamp 324 are integrally formed as part of a monolithic structure with the plate 304. The first clamp 310 can be secured to the first cable 202, and the additional clamp 324 can be secured to the second cable 204. The first clamp 310 maintains the first cable 202 in alignment with the first port 216, keeping the first cable 202 aligned in a direction to extend into the housing 102 through the first port 216. As explained above, the first cable 202 can be maintained in a desired alignment relative to the axis 308 by the first clamp 310, and the second cable 204 can be maintained in a desired alignment relative to an axis, similar to the axis 308, corresponding to the second port 220 by the second clamp 324.

Figure 8:
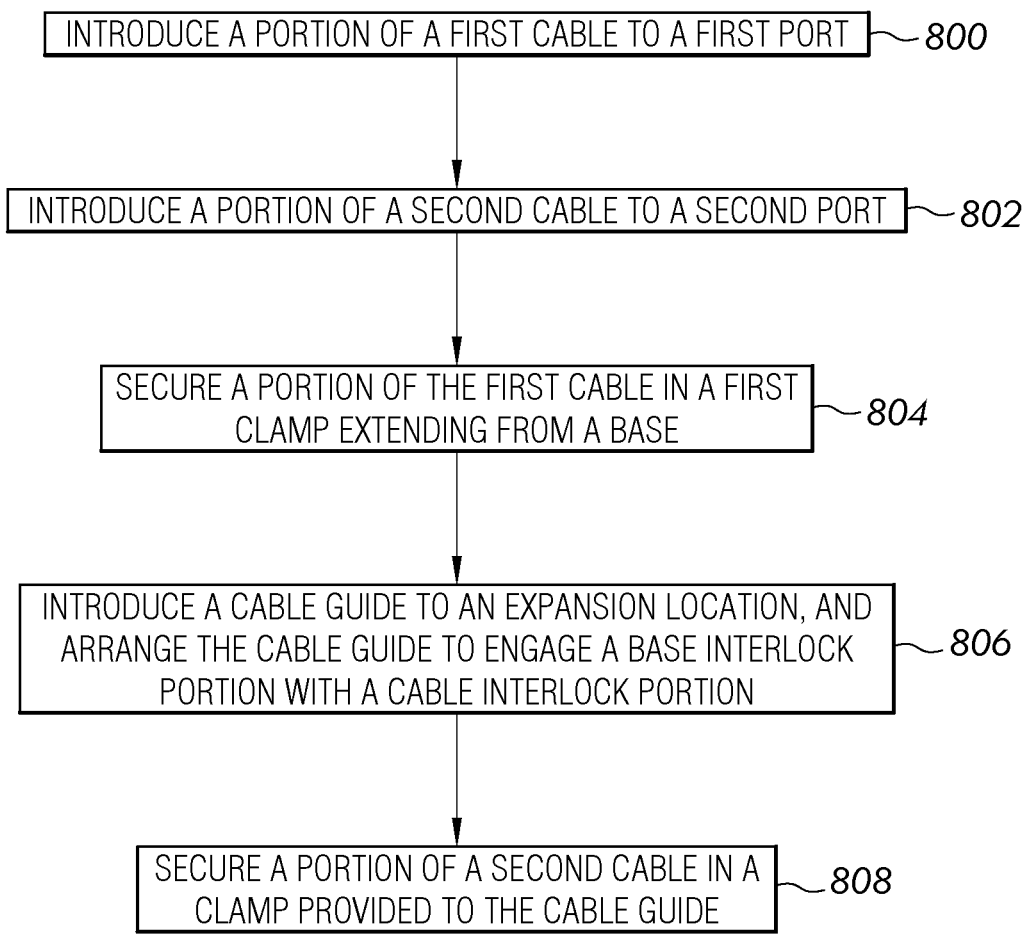
FIG. 8 is a flow diagram schematically depicting a method of expanding a capacity of a cable management system for a splice enclosure.

A method of configuring the splice enclosure is described with reference to FIG. 8. Some embodiments of the method involve extending a portion of a first cable 202 through the first port 216, at 800. A grommet 218 can be used to seal a space between an internal periphery of the first port 216 and an external periphery of the portion of the first cable 202. The cap 106 is to be installed on a housing 102 of the splice enclosure 100, to enclose an interior space where the organizer 210 is to maintain a connection between the first cable 202 and another cable, such as the cable 226, for example.

At 802, a portion of the second cable 204 is extended through another port defined by the cap 106, such as one of the extension ports 224. A grommet can be used to seal a space between an internal periphery of the expansion port 224 and an external periphery of the portion of the cable 226.

A region of the first cable 202, which is to be exposed externally of the cap 106 with the cap 106 installed on the housing 102, is secured within the first clamp 310 at 804. According to some embodiments, the externally-exposed portion of the first cable 202 can be disposed between the bolster 312 and the keeper 316 as described above. The fastener 320 can be adjusted to hold the first cable 202 along the longitudinal axis 308 leading into the first port 216.

At 806, a cable guide 502 is introduced to an available expansion location 330 (i.e., open, and unoccupied by a cable guide 502), so the clamp 514 is arranged adjacent to the respective expansion port 224 of the expansion location 330. The cable guide 502 is separately installed, independent of the base 302, as part of the cable management system 104. The cable guide 502 is installed to maintain an alignment of the cable 226 introduced to the interior space defined by the housing 102 through the expansion port 224.

Some embodiments of the method involve arranging the cable guide 502 to engage a base interlock portion 400 provided to the base 302 with a cable guide interlock portion 500. Such engagement interferes with rotation of the platform 504 of the cable guide 502 relative to the base interlock portion 400. The cable guide 502 can be arranged at the expansion location 330, such that a portion of the platform 504 is also disposed between the guide surfaces 332 of the cap 106. The bolt or other fastener 338 can be introduced to the aperture 512 in the platform 504, and the nut 700 or other locking member used to secure the platform 504 in place at the expansion location 330. According to some embodiments, another locking system other than the fastener 338 and nut 700 can be utilized without departing from the scope of the present disclosure.

A protruding region of the cable 226, that is exposed externally of the cap 106 while the cap installed on the housing 102, is secured within the clamp 514 provided to the cable guide 502 at 808. The cable 226 is secured within the clamp 514 in a manner similar to the manner in which the cable 202 is secured within the first clamp 310 provided to the base 302, to maintain a position of the secured region of the cable 226 relative to the region of the cap 106 defining the expansion port 224.

An additional cable guide 502 can be installed at one, a plurality, or each of the available expansion locations 330 on the cap 106 according to the method described herein, to maintain an alignment of a portion of a cable relative to a respective expansion port 224. An embodiment of a cable management system 104 with a capacity of cable guides 502 installed is shown in FIG. 7.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cable management system comprising:
   a cap that cooperates with a housing to enclose a connection between a first cable and a second cable, wherein the cap defines a first port through which the first cable is extendable into the housing, and a second port through which the second cable is extendable into the housing;
   a base to be coupled to an external side of the cap opposite an interior space defined by the housing within which the connection between the first cable and the second cable is enclosed, the base comprising:

a first clamp that protrudes from a surface of the base and maintains an alignment of a portion of the first cable with an axis relative to a plane within which the first port is defined, and a base interlock portion; and a first cable guide, separate from the base, that is to be installed on the external side of the cap to maintain an alignment of a portion of the second cable with the second port, the first cable guide comprising a second clamp, and a first cable guide interlock portion that cooperates with the base interlock portion to interfere with separation of the first cable guide from the base.

2. The cable management system of claim 1, wherein the cap comprises:

a guide surface that defines a region where the first cable guide is to be installed on the cap, and interferes with angular adjustment of the first cable guide about the first clamp protruding from the surface of the base while the first cable guide is installed on the cap.

3. The cable management system of claim 1, wherein the cap defines a third port through which a third cable is extendable into the housing, and the base comprises a third clamp that protrudes from the surface of the base to maintain an alignment of a portion of the third cable with the third port.

4. The cable management system of claim 1 comprising:

a fastener that cooperates with the first cable guide and the cap to interfere with separation of the first cable guide from the cap and the base.

5. The cable management system of claim 1, wherein the cap comprises a valve that controls a pressure within the housing, and the base defines an aperture that receives the valve, and renders the valve accessible through the aperture defined by the base while the base is installed on the cap.

6. The cable management system of claim 1, wherein the cap defines a third port through which a third cable is extendable into the housing, and the cable management system comprises a second cable guide, separate from the base, that is to be installed on the cap, the second cable guide comprising:

a third clamp that cooperates with a portion of the third cable, to maintain an alignment of a portion of the third cable with the third port, and a second cable guide interlock portion that cooperates with the base interlock portion to interfere with separation of the second cable guide from the base.

7. The cable management system of claim 6, wherein the first cable guide and the second cable guide have a common shape.

8. The cable management system of claim 6, wherein a first angle is defined between the first port and the second port relative to a central point of the cap, a second angle is defined between the second port and the third port relative to the central point of the cap, and the first angle is equal to the second angle.

9. A splice enclosure comprising:

a housing defining an interior space;

a connector module that supports a connection between a first cable and a second cable within the interior space defined by the housing; and a cable management system comprising:

a cap that cooperates with the housing to enclose the connection between the first cable and the second cable, wherein the cap defines a first port through which the first cable is extendable into the housing, and a second port through which the second cable is extendable into the housing;

a base to be coupled to the cap, the base comprising:

a first clamp that protrudes from a surface of the base and maintains an alignment of a portion of the first cable with an axis relative to a plane within which the first port is defined, and a base interlock portion; and a first cable guide, separate from the base, that is to be installed on the cap when the cap is cooperating with the housing to enclose the interior space to maintain an alignment of a portion of the second cable with the second port, the first cable guide comprising a second clamp, and a first cable guide interlock portion that cooperates with the base interlock portion to interfere with separation of the first cable guide from the base.

10. The splice enclosure of claim 9, wherein the cap comprises:

a guide surface that defines a region where the first cable guide is to be installed on the cap, and interferes with angular adjustment of the first cable guide about the first clamp protruding from the surface of the base while the first cable guide is installed on the cap.

11. The splice enclosure of claim 9, wherein the cap defines a third port through which a third cable is extendable into the housing, and the base comprises a third clamp that protrudes from the surface of the base to maintain an alignment of a portion of the third cable with the third port.

12. The splice enclosure of claim 9 comprising:

a fastener that cooperates with the first cable guide and the cap to interfere with separation of the first cable guide from the cap and the base.

13. The splice enclosure of claim 9, wherein the cap comprises a valve that controls a pressure within the housing, and the base defines an aperture that receives the valve, and renders the valve accessible through the aperture defined by the base while the base is installed on the cap.

14. The splice enclosure of claim 9, wherein the cap defines a third port through which a third cable is extendable into the housing, and the cable management system comprises a second cable guide, separate from the base, that is to be installed on the cap, the second cable guide comprising:

a third clamp that cooperates with a portion of the third cable, to maintain an alignment of a portion of the third cable with the third port, and a second clamp interlock portion that cooperates with the base interlock portion to interfere with separation of the second cable guide from the base.

15. The splice enclosure of claim 14, wherein the first cable guide and the second cable guide have a common shape.

16. The splice enclosure of claim 14, wherein a first angle is defined between the first port and the second port relative to a central point of the cap, a second angle is defined between the second port and the third port relative to the central point of the cap, and the first angle is equal to the second angle.

17. A method comprising:

extending a portion of a first cable through a first port defined by a cap, wherein the cap is to be installed on a housing to enclose an interior space where a connection between the first cable and a second cable is to be located;

extending a portion of the second cable through a second port defined by the cap;

securing a protruding region of the first cable, exposed at an external side of the cap to be external of the housing with the cap installed, within a first clamp that protrudes from a surface of a base coupled to the cap to maintain a position of the protruding region of the first cable relative to a region of the cap defining the first port;

arranging a first cable guide relative to the base on the cap to position a second clamp provided to the first cable guide adjacent to the second port; and securing a protruding region of the second cable, exposed at the external side of the cap to be external of the housing with the cap installed, within the second clamp to maintain a position of the protruding region of the second cable relative to a region of the cap defining the second port.

18. The method of claim 17, wherein arranging the first cable guide relative to the base comprises:

engaging a base interlock portion provided to the base with a first cable guide interlock portion to interfere with separation of the first cable guide from the base.

19. The method of claim 17, comprising:

extending a portion of a third cable through a third port defined by the cap;

arranging a second cable guide relative to the base on the cap to position a third clamp provided to the second cable guide adjacent to the third port; and securing a protruding region of the third cable, exposed at the external side of the cap to be external of the housing with the cap installed, within the third clamp to maintain a position of the protruding region of the third cable relative to a region of the cap defining the third port.

20. The method of claim 19, wherein arranging the second cable guide relative to the base comprises:

engaging a base interlock portion provided to the base with a second cable guide interlock portion provided to the second cable guide to interfere with separation of the second cable guide from the base.

* * * * *